United States Patent
Grizzle

(10) Patent No.: US 8,820,768 B2
(45) Date of Patent: Sep. 2, 2014

(54) HIGH LOCK WARNING SYSTEM FOR FIFTH WHEEL HITCHES

(71) Applicant: Roger D. Grizzle, Eden, GA (US)

(72) Inventor: Roger D. Grizzle, Eden, GA (US)

( * ) Notice: Subject to any disclaimer, the term of this patent is extended or adjusted under 35 U.S.C. 154(b) by 0 days.

(21) Appl. No.: 13/900,460

(22) Filed: May 22, 2013

(65) Prior Publication Data

US 2013/0320650 A1 Dec. 5, 2013

Related U.S. Application Data

(60) Provisional application No. 61/652,785, filed on May 29, 2012.

(51) Int. Cl.
*B60Q 5/00* (2006.01)
*B60D 1/01* (2006.01)

(52) U.S. Cl.
CPC ............... *B60Q 5/001* (2013.01); *B60D 1/015* (2013.01)
USPC .......................................... 280/433; 340/431

(58) Field of Classification Search
CPC ................................. B60Q 5/001; B60D 1/015
USPC ........... 280/433, 432, 455.1, 446.1, 474, 449; 340/435, 425.5, 436, 438, 825.06, 991, 340/992, 993, 994, 903, 904, 431
See application file for complete search history.

(56) References Cited

U.S. PATENT DOCUMENTS

| | | | |
|---|---|---|---|
| 3,924,257 A | 12/1975 | Roberts | |
| 4,281,846 A * | 8/1981 | Hall | 280/432 |
| 4,405,146 A * | 9/1983 | Mitchell | 280/432 |
| 4,991,863 A * | 2/1991 | Hosmer | 280/432 |
| 5,108,123 A | 4/1992 | Rubenzik | |
| 5,456,483 A * | 10/1995 | Madsen et al. | 280/432 |
| 5,729,194 A | 3/1998 | Spears et al. | |
| 6,252,497 B1 | 6/2001 | Dupay et al. | |
| 6,587,041 B1 | 7/2003 | Brown, Jr. | |
| 2006/0225293 A1 | 10/2006 | Godwin | |

FOREIGN PATENT DOCUMENTS

GB 1180228 2/1970
GB 1324822 7/1973

* cited by examiner

*Primary Examiner* — Joseph M Rocca
*Assistant Examiner* — Jacob Knutson
(74) *Attorney, Agent, or Firm* — Richard C. Litman

(57) ABSTRACT

The high lock warning system for fifth wheel hitches provides audible and/or visual warning to the operator of a towing vehicle in the event that the king pin of the trailer passes beyond the forward edge of the fifth wheel hitch plate of the towing vehicle during hitching operations. The system includes a panel pivotally attached to the forward portion of the fifth wheel. One or more warning devices are activated if the panel is deflected by the king pin during hitching operations, i.e., a high lock condition. The system may also include an indicator to show proper engagement of the king pin in the fifth wheel hitch. The high lock warning actuator panel may be secured in its normal position by a shear pin that breaks in the event of a high lock, and/or a spring to return the panel to its normal position after a high lock.

6 Claims, 6 Drawing Sheets

HIGH LOCK WARNING SYSTEM FOR FIFTH WHEEL HITCHES

CROSS-REFERENCE TO RELATED APPLICATION

This application claims the benefit of U.S. Provisional Patent Application Ser. No. 61/652,785, filed May 29, 2012.

BACKGROUND OF THE INVENTION

1. Field of the Invention

The present invention relates to trailer safety devices, and more particularly to a high lock warning system for fifth wheel hitches that alerts the operator of a truck being hitched to a semi-trailer in the event that the king post of the trailer passes over the fifth wheel plate of the towing vehicle, i.e., a "high lock" condition.

2. Description of the Related Art

Larger trucks, i.e., the tractors of tractor-trailer combinations, are universally equipped with "fifth wheel" type hitches comprising a large, heavy steel plate having a rearward oriented guide slot and a receptacle for the mating hitch component ("king pin") of the trailer. Fifth wheel hitches enable the towing vehicle to tow a larger trailer than most other types of hitches will permit by supporting a large percentage of the weight of the trailer upon the rear of the towing vehicle. This type of hitch has also been scaled down for installation in smaller vehicles, such as pickup trucks and the like, for towing lighter trailers that are still relatively large and heavy for the size of the towing vehicle.

The trailer is hitched to the towing vehicle by backing the rear portion of the towing vehicle beneath the forward portion of the trailer until the king pin contacts the fifth wheel plate. Normally, the king pin will slide up the rearward facing slot of the fifth wheel plate and drop into the receptacle in the center of the plate, where a retaining mechanism captures the end of the king pin to hold it positively in place.

However, a potential problem can occur if the king pin of the trailer misses the receptacle in the center of the fifth wheel. The operator of the towing vehicle cannot see whether the king pin is properly engaged or not; he or she must operate by feel and sound to detect the dropping of the king pin into the fifth wheel receptacle. In the event that the fifth wheel plate slides past the king pin without engaging, the forward edge of the fifth wheel plate may pass completely beyond the king pin during the backing maneuver of the towing vehicle. When this occurs, the king pin may drop over the forward edge of the fifth wheel hitch plate, giving the vehicle operator the impression that the hitching maneuver has been accomplished successfully. This is known as a "high lock" when it occurs, and it will be seen that it is not a truly hitched condition between the towing vehicle and the trailer. If the operator drives forward in such a high lock condition, the king pin of the trailer will very soon slip around the forward edge of the fifth wheel plate, with the trailer detaching from the towing vehicle with disastrous consequences.

Thus, a high lock warning system for fifth wheel hitches solving the aforementioned problems is desired.

SUMMARY OF THE INVENTION

The high lock warning system for fifth wheel hitches provides an alert or warning to the operator of the towing vehicle when a high lock condition occurs when hitching a trailer to a towing vehicle having a fifth wheel type hitch. The system includes a movable panel that extends forward from the forward portion of the fifth wheel hitch and deflects downward in the event that the trailer king pin passes completely over the fifth wheel plate and contacts the panel. The deflection of the panel closes one or more switches that, in turn, provide power to activate one or more warning devices, e.g., audible or visual signal devices.

The warning device(s) may be installed in the cab of the towing vehicle. The system may receive its electrical power from the electrical system of the towing vehicle. Alternatively, the system may be self-contained, and the electrical power may be provided by a dedicated battery connected to the actuating panel and the warning devices located on or near the panel. The panel may be permanently or removably attached to the fifth wheel hitch plate. An additional circuit may be provided having a switch in the king pin receptacle or latch mechanism of the fifth wheel hitch plate to indicate the proper engagement of the king pin in the fifth wheel hitch plate.

The high lock warning system includes means for supporting the warning actuator panel generally parallel to the plane of the fifth wheel hitch plate. In one embodiment a soft shear pin (cotter pin, etc.) is installed through a fixed support arm extending from the fifth wheel hitch plate and a movable arm supporting the actuator panel. The pin is sheared when the actuator panel is pushed downward by the king pin of the trailer in a high lock condition, to indicate that a high lock has occurred. Alternatively, or in addition to such a shear pin, a spring may be installed between fixed and movable components to hold the panel in its normal position. The spring is deflected with the panel in the event of a high lock condition, and resiliently raises the panel back to its normal position when the king pin is lifted from the panel.

These and other features of the present invention will become readily apparent upon further review of the following specification and drawings.

DETAILED DESCRIPTION OF THE PREFERRED EMBODIMENTS

The high lock warning system for fifth wheel hitches provides a warning system for the driver or operator of the towing vehicle equipped with such a fifth wheel hitch (tractor truck, pickup truck, etc.) when the king pin of the trailer misses the king pin receptacle in the fifth wheel plate and catches on the forward edge of the fifth wheel plate during trailer hitching operations. The system may include or comprise an optional alert apparatus comprising an annunciator (light, etc.) to inform the driver or operator when the king pin is properly seated in the fifth wheel hitch plate, thereby also informing the driver or operator that there is no high lock condition for the trailer hitching operation.

Figure 1:
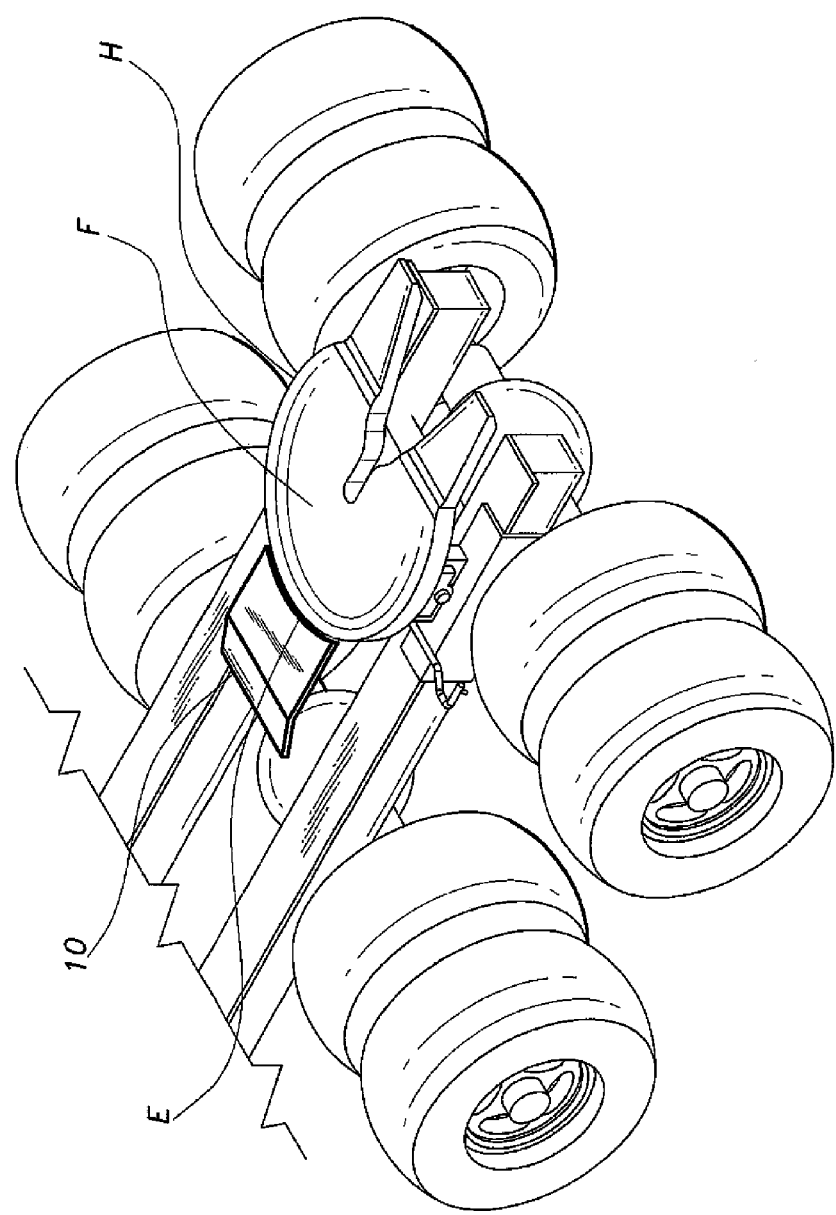
FIG. 1 is an environmental, perspective view of a high lock warning system for fifth wheel hitches according to the present invention, showing an exemplary installation on the front of a fifth wheel hitch plate.

FIG. 1 of the drawings is an illustration of an exemplary rear wheel assembly, frame, and fifth wheel hitch as found in a conventional large tractor truck as used in the transport of large semi-trailers. The structure illustrated in FIG. 1 differs from the conventional in that it also includes an actuator panel 10 extending forward from the forward portion F of the hitch plate H, in front of the forward edge E thereof. The actuator panel 10 is pivotally attached to the fifth wheel hitch plate H, as shown in subsequent drawings described further below. Deflection of the actuator panel 10 due to a high lock condition, as shown in FIG. 2, actuates a warning circuit by means of an electrical switch to alert the driver or operator of such an unsafe high lock condition.

Figure 2:
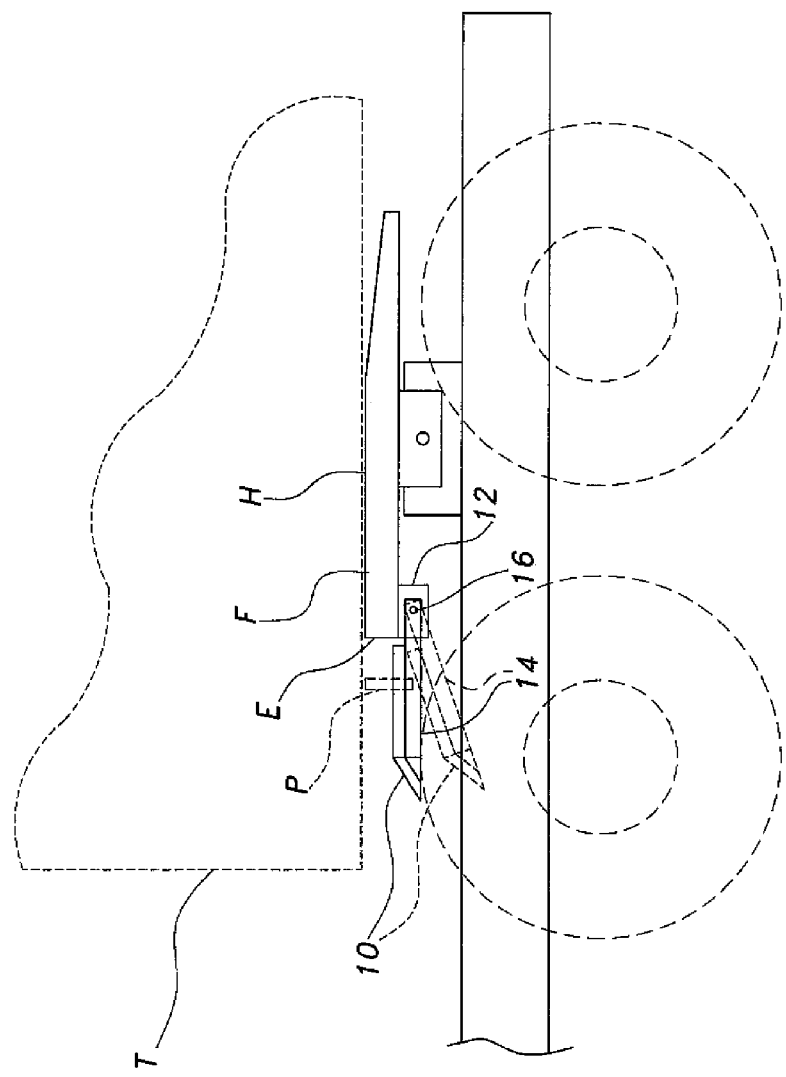
FIG. 2 is a diagrammatic left side elevation view of the high lock warning system of FIG. 1, showing the installation of the panel on the fifth wheel hitch plate in solid lines and deflection of the panel to actuate the warning when the king pin of a trailer passes over the front edge of the fifth wheel hitch plate in phantom lines.

FIG. 2 provides a diagrammatic left side elevation view showing the downward deflection of the actuator panel 10 due to a high lock condition. The actuator panel 10 is pivotally attached to the fifth wheel hitch plate H by a pair of panel attachment members 12 (e.g., spaced apart brackets) that are attached to the underside of the forward portion F of the hitch plate H. The panel attachment members 12 may be fixed to the underside of the hitch plate H by any suitable means, e.g., bolting, welding (for similar metals), or may even be removably attached (magnetically, cooperating mechanical clips, tracks, channels, etc.) to the hitch plate H. Corresponding panel support arms 14 are attached to the panel attachment members 12 by pivots 16, with the actuator panel 10 between or from the two panel support arms 14.

In FIG. 2, the rearward portion of the truck tractor has been backed beneath the forward portion of the semi-trailer T to the extent that the king pin P of the trailer T is forward of the forward edge E of the fifth wheel hitch plate H, i.e., a high lock condition. The king pin P has depressed or deflected the actuator panel 10 downward, as shown in broken lines in FIG. 2. This results in the actuation of a high lock alarm to alert the operator or driver of the truck of such a high lock condition. The forward edge of the actuator panel 10 is bent, sloped, or curved downward, as shown in the various drawings. This allows the king pin P of the trailer T to slide back from the forward edge of the panel 10 in the event that the king pin passes completely over the actuator panel 10 during a hitching operation.

Figure 3:
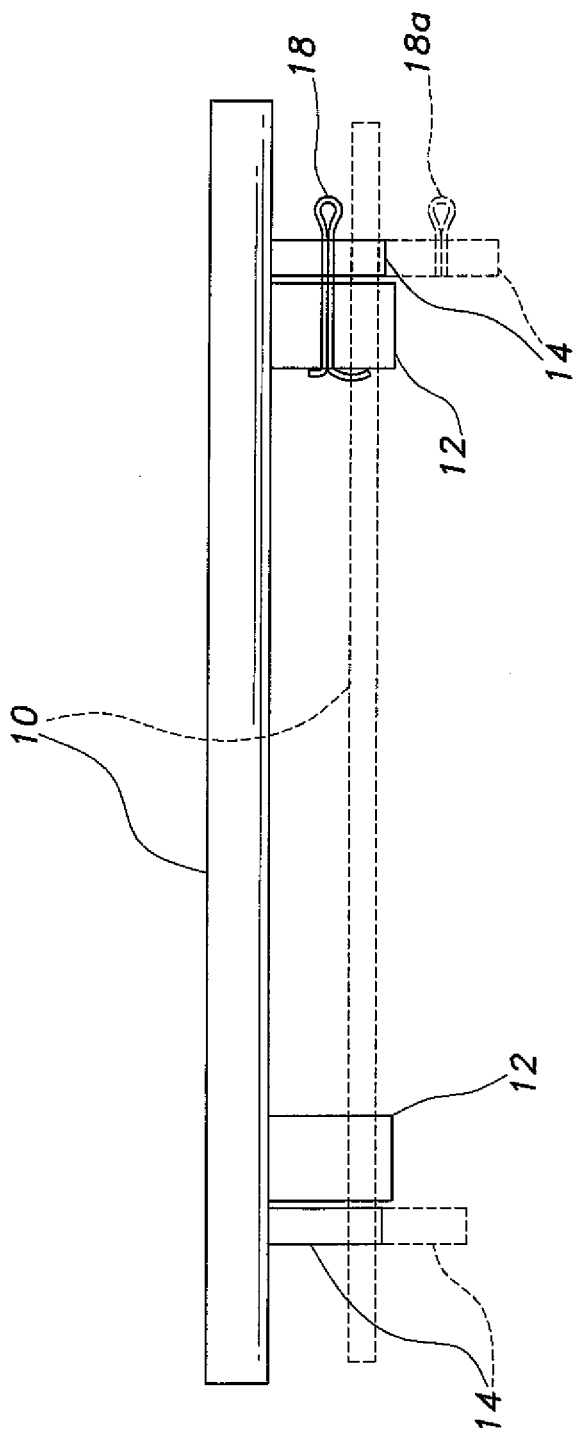
FIG. 3 is a diagrammatic front elevation view of a first embodiment of a panel assembly of the high lock warning system of FIG. 1, illustrating a shear pin installed to hold the actuator panel up until the panel is deflected by a high lock condition.

It will be seen that some means is required to support the actuator panel 10 in its raised position approximately coplanar with the hitch plate H during normal operation, when it is not deflected by the king pin P. FIG. 3 illustrates one embodiment of such support means, comprising a shear pin 18 (e.g., cotter pin, roll pin, etc.) installed through corresponding passages 20 (shown in FIG. 4) through at least one of the panel attachment members 12 and the corresponding panel support arm 14. The shear pin 18 is preferably relatively weak, having little more than the minimum strength required to support the unladed weight of the actuator panel 10 and its support arms 14. Thus, the pin 18 will shear, as shown by the broken line portion of the pin 18a in FIG. 3, when the actuator panel 10 is forced down (as also shown in broken lines in FIG. 3) by the load imposed by the king pin of the trailer. The use of a shear pin 18 serves as an indicator of the deflection of the actuator panel 18 due to a high lock condition, alerting the driver or operator and/or others that such a condition has occurred in the past, even if the trailer is no longer positioned on the tractor.

Figure 4:
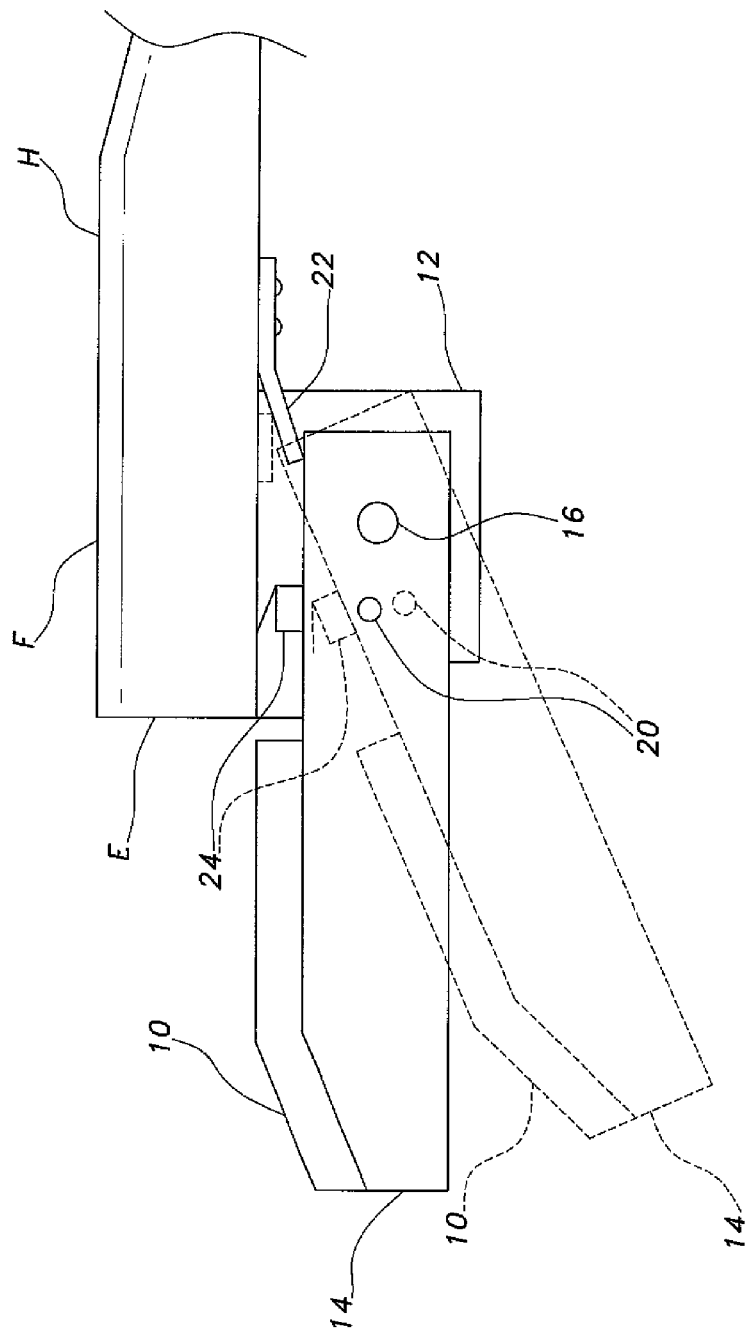
FIG. 4 is a diagrammatic left side elevation view of a second embodiment of a panel assembly of the high lock warning system of FIG. 1, illustrating an exemplary spring-biased panel.

FIG. 4 of the drawings provides a more detailed side elevation view illustrating an alternative means for supporting the unladed actuator panel 10 and its support arms 14, comprising a spring 22 (e.g., a leaf spring) that bears against a portion of one of the support arms 14. In the example of FIG. 3, the distal end of the spring 22 bears downward on the rearward end of the support arm 14, thereby urging the opposite forward portion upward, i.e., the portion supporting the actuator panel 10. It will be seen that numerous alternative spring arrangements and configurations may be provided to accomplish this function, e.g., a coil torsion spring disposed around one of the support arm pivots 16, a compression spring disposed beneath the forward end of the actuator panel 10 or one of its arms 14, etc. The spring support results in the actuator panel 10 returning to its normal substantially horizontal position when the king pin of the trailer is removed therefrom, i.e., the high lock condition is terminated. It will be seen that both a spring bias for the actuator panel 10 and a shear pin 18 may be installed, if desired, so that the broken shear pin 18 still provides evidence of a high lock condition, even after the spring 22 returns the panel 10 to its normal position.

Figure 5:
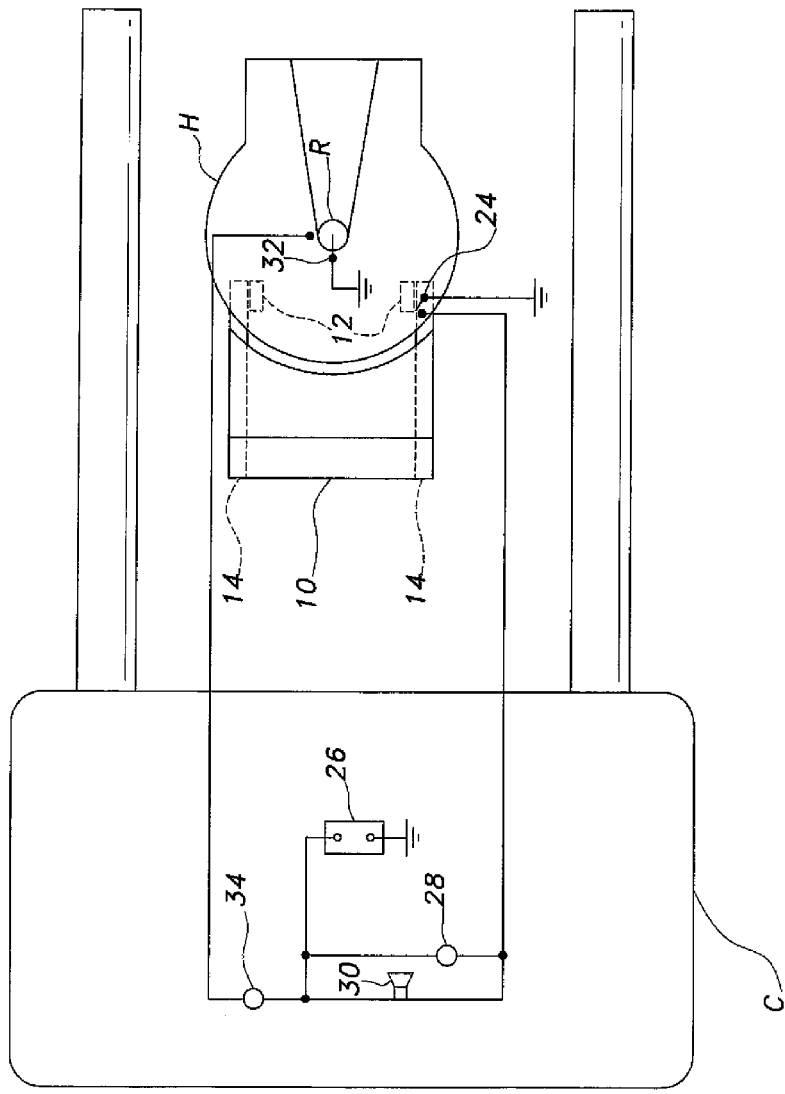
FIG. 5 is a diagrammatic top plan view of an embodiment of a high lock warning system for fifth wheel hitches according to the present invention, wherein the warning devices are located in the truck cab and electrical power is supplied by the vehicle.

The downward deflection of the actuator panel 10 results in the actuation of an alarm or annunciator system to alert the driver or operator of the high lock condition. FIG. 4 also illustrates an exemplary electrical switch 24 that may be used. FIG. 5 provides a schematic drawing of an exemplary embodiment of an electrical system for operating the annunciators of the apparatus. The electrical system illustrated schematically in FIG. 5 is powered by the conventional electrical storage battery 26 that comprises a component of the conventional electrical system of the towing vehicle, and is shown situated in the cab C of the vehicle in FIG. 5. The battery 26 provides electrical power to a warning light 28 and audible device 30 (e.g., horn, bell, etc.) situated in the cab C of the vehicle. While both a visual warning device 28 and audible warning device 30 are illustrated, it will be seen that one of the devices may be eliminated, so that either the light 28 or the audible warning 30 provides the sole warning of a high lock condition.

Power for the circuit is controlled by the normally open switch 24 installed at the actuator panel 10 or one of its support arms 14. The switch 24 is actuated (closed) when the actuator panel 10 is deflected by the king pin of the trailer in a high lock condition. Electrical power then flows through the closed circuit from the battery 26 to power the light 28 and/or audible device 30, thence across the closed switch 24 to ground. The above-described order of components is exemplary, and it will be apparent to those skilled in the art that the various components of this circuit may be arranged in some alternative order and still provide the desired function.

FIG. 5 also illustrates an alternative means of informing the driver or operator of the hitch condition. A second normally open switch 32 is installed at the king pin receptacle R of the fifth wheel hitch plate H. This switch 32 is connected to an annunciator light 34 that is connected to the battery 26. The switch 32 is closed only when the king pin of the trailer engages the receptacle R in the hitch plate H, i.e., a proper hitching operation. When this occurs, electrical current from the battery 26 flows through the annunciator light 34 and across the closed hitch receptacle switch 32 to ground, thereby illuminating the light 34. Again, the order of the components in this exemplary circuit may be rearranged in any desired configuration. This system serves as a high lock notification system, in that it alerts the driver or operator that such a high lock condition has not occurred due to a correct hitch procedure.

Figure 6:
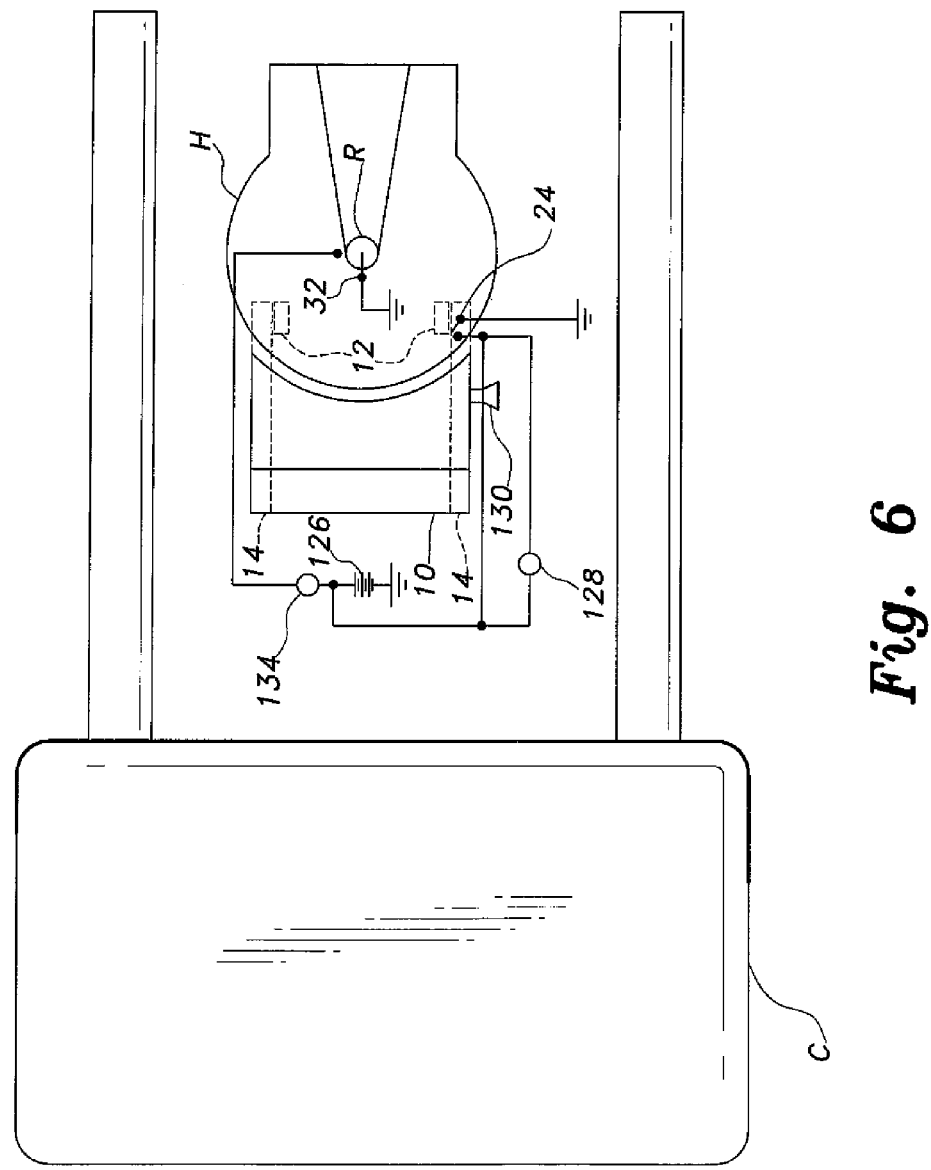
FIG. 6 is a diagrammatic top plan view of an embodiment of a high lock warning system for fifth wheel hitches according to the present invention, wherein the warning devices and battery are disposed adjacent the fifth wheel.

FIG. 6 provides a diagrammatic illustration of an exemplary embodiment of an alternative annunciator system, wherein all of the components are situated at or adjacent to the actuator panel 10. The system of FIG. 6 includes the normally open high lock warning switch 24 and the normally open hitch plate receptacle switch 32, as in the exemplary system of FIG. 5. However, the system of FIG. 6 includes a dedicated battery 126 (e.g., nine-volt cell, rechargeable battery, etc.) that is separate from the conventional towing vehicle battery of FIG. 5. The electrical cell or battery 126 provides electrical power to a warning light 128 and/or to a horn, buzzer, bell, or other audible device 130, which may also be located with or adjacent to the actuator panel 10. The light 128 and audible device 130 may be the same types of devices as the light 28 and audible device 30 of the circuit of FIG. 5, if sufficient electrical power is provided by the battery or cell 126. This circuit functions the same as the warning circuit illustrated in FIG. 5 and discussed further above, i.e., the battery or cell 126 provides electrical power to the light 128 and/or audible device 130 when the switch 24 is closed by the deflection of the actuator panel 10 due to a high lock condition.

FIG. 6 also illustrates a provision for a circuit to indicate a proper hitch operation, similar to that illustrated in FIG. 5. The difference between the proper hitch annunciator system of FIG. 6 and that of FIG. 5 is that the system of FIG. 6 is contained with the actuator panel 10 and receives power from the separate battery or cell 126 rather than being in the cab C of the towing vehicle. The circuit of FIG. 6 provides power to a proper hitch annunciator light 134 from the battery 126, with power being controlled by the hitch receptacle switch 32, as in the case of the circuit of FIG. 5. The switch 32 is normally open when there is no hitch pin installed in the hitch plate receptacle R. In this state, no electrical power flows through this circuit and the light 134 is not illuminated. When the king pin of the trailer engages the hitch plate receptacle R, as in a proper hitch operation, the hitch plate receptacle switch 32 is closed to close the circuit and allow current to flow therethrough to illuminate the proper hitch condition light 134. Other annunciator devices may be used to alert the driver or operator of a proper hitch condition, but preferably a light is used rather than an audible device, as this annunciator will normally remain activated during the entire time that the king pin of the trailer is engaged with the hitch plate receptacle.

While the exemplary high lock warning systems disclosed herein are shown and described with a fifth wheel hitch plate apparatus of a large tractor truck as used for pulling a large semi-trailer, it will be seen that the systems are readily adaptable to smaller fifth wheel hitch systems or mechanisms. Many such fifth wheel hitch systems or devices are available as aftermarket units for removable or permanent installation in the bed of a pickup truck or the like. The high lock warning systems shown and described herein may be installed with such smaller fifth wheel hitch systems. The self-contained system illustrated in FIG. 6 is particularly well suited for use with a removable fifth wheel hitch, as no additional labor is required for the installation and removal of the warning system when the hitch is installed or removed from the towing vehicle. However, the need for such a high lock warning system is universal with all fifth wheel hitch systems, and the high lock warning system responds to this need, whether for larger fifth wheel hitch devices or for smaller removable or permanently installed fifth wheel hitch devices.

It is to be understood that the present invention is not limited to the embodiments described above, but encompasses any and all embodiments within the scope of the following claims.

I claim:

1. A fifth wheel hitch and a high lock warning system therefor, comprising:
a fifth wheel hitch plate having a king pin receptacle, a forward portion, and a forward edge;
a plurality of panel attachment members extending from the forward portion of the hitch plate;
a panel support arm pivotally attached to and extending forward from each of the panel attachment members;
an actuator panel extending across the panel support arms, the panel support arms being biased to support the panel in a substantially horizontal position;
at least one warning annunciator; and
an electrical switch disposed on the actuator panel, the switch being configured to close and actuate the at least one warning annunciator when the actuator panel is deflected downward by a king pin sliding past the fifth wheel hitch plate in a high lock state.

2. The fifth wheel hitch and high lock warning system according to claim 1, wherein said at least one annunciator comprises a first annunciator and a second annunciator, the system further comprising a second electrical switch disposed at the king pin receptacle of the hitch plate, the second electrical switch being configured to close and to actuate the second annunciator when the king pin is inserted into the king pin receptacle of the hitch plate.

3. The fifth wheel hitch and high lock warning system according to claim 1, further comprising means for supporting the actuator panel in a substantially horizontal orientation, the means comprising a shear pin disposed through one of the panel attachment members and the corresponding panel support arm and at least one spring biasing the corresponding panel support arm.

4. The fifth wheel hitch and high lock warning system according to claim 1, wherein the at least one warning annunciator comprises at least one annunciator selected from the group consisting of an audible device and a warning light.

5. The fifth wheel hitch and high lock warning system according to claim 1, further comprising an electrical power source to provide power for the high lock warning system, the electrical power source being disposed with the actuator panel, the at least one warning annunciator being disposed at the actuator panel, the panel attachment members being removably attached to the hitch plate.

6. The fifth wheel hitch and high lock warning system according to claim 5, wherein said at least one annunciator comprises a first annunciator and a second annunciator, the system further comprising a second electrical switch disposed at the king pin receptacle of the hitch plate, the second electrical switch being configured to close and to actuate the second annunciator when the king pin is inserted into the king pin receptacle of the hitch plate.

* * * * *